United States Patent

[11] 3,633,288

| [72] | Inventor | Richard G. Le Francis<br>3413 Buccaneer Circle, Sacramento, Calif. 95826 |
|---|---|---|
| [21] | Appl. No. | 75,344 |
| [22] | Filed | Sept. 25, 1970 |
| [45] | Patented | Jan. 11, 1972 |

[54] BASE NUMERAL GAME DEVICE
6 Claims, 5 Drawing Figs.

[52] U.S. Cl. ..................................................... 35/31 R
[51] Int. Cl. ...................................................... G09b 19/02
[50] Field of Search ........................................... 35/30, 31
R, 31 D, 31 F, 32, 33

[56] References Cited
UNITED STATES PATENTS

| 3,138,879 | 6/1964 | Flewelling .................... | 35/32 |
| 3,430,363 | 3/1969 | Della Gala .................... | 35/31 R |

FOREIGN PATENTS

| 587,220 | 4/1947 | Great Britain ................ | 35/33 |

*Primary Examiner*—Wm. H. Grieb
*Attorney*—Alexander B. Blair

ABSTRACT: A device having longitudinal slots at the top thereof with vertical rods protruding through the slots to a height dependent on the positioning of a horizontal master control rod from which the vertical rods extend, the device also having an inclined longitudinal slot on each side thereof with stepped grooves therein for the desired positioning of the master control rod.

BASE NUMERAL GAME DEVICE

This invention relates to a teaching device for children in the fifth and sixth grades. Children have heretofore suffered through hours of boring rote memorization in both the school and the home in learning their arithmetic.

A primary object of this invention is to produce a behavioral change where a student or adult will gain knowledge of several place value systems using different base systems.

Another object of this invention is to take the boredom out of learning arithmetic by making a game out of the learning process.

Still another object of this invention is to visually allow the child to get a better perspective of the actual logic behind arithmetic.

A further object of this invention is to allow a child to combine his visual, mechanical, and written arithmetic abilities simultaneously at his own desk in the classroom as the teacher is teaching arithmetic.

The above and other objects of this invention will become apparent to those skilled in the art after taking into consideration the following detailed description of the preferred embodiment of this invention taken together with the accompanying drawing in which.

Figure 1:
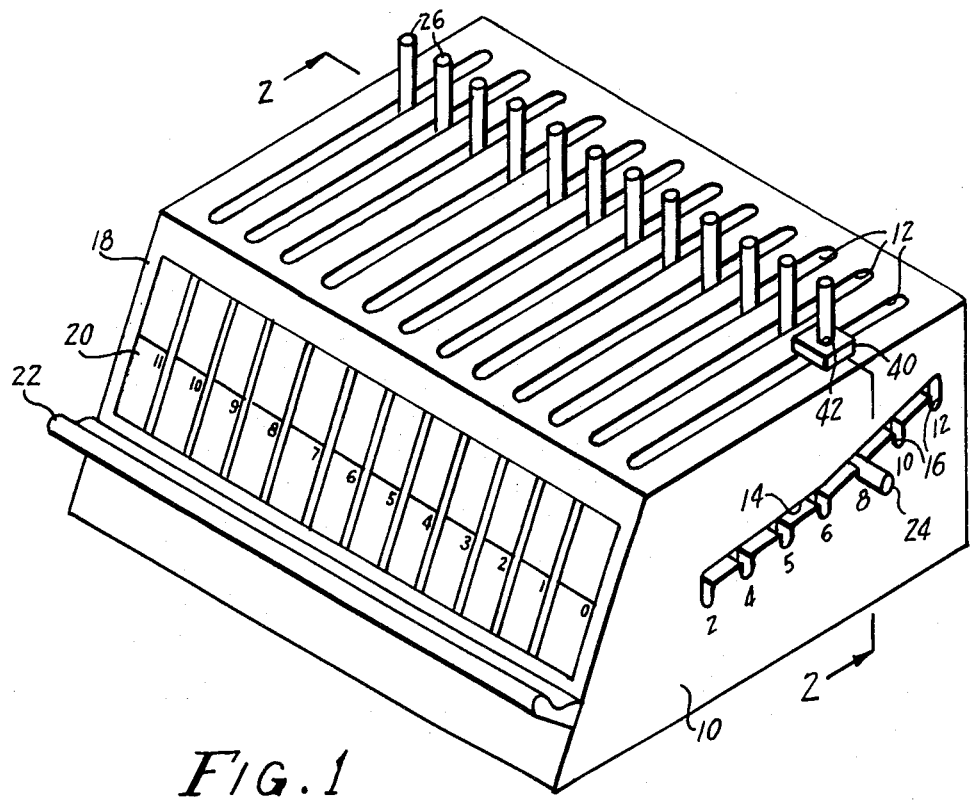
FIG. 1 is a perspective view of the device.
Figure 2:
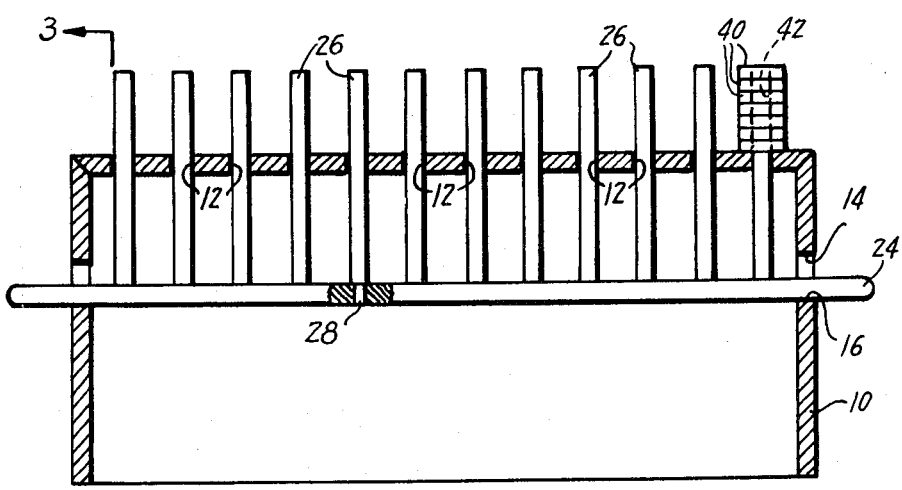
FIG. 2 is a sectional view taken on line 2—2 of FIG. 1 showing a cross-sectional portion of a master control rod.
Figure 3:
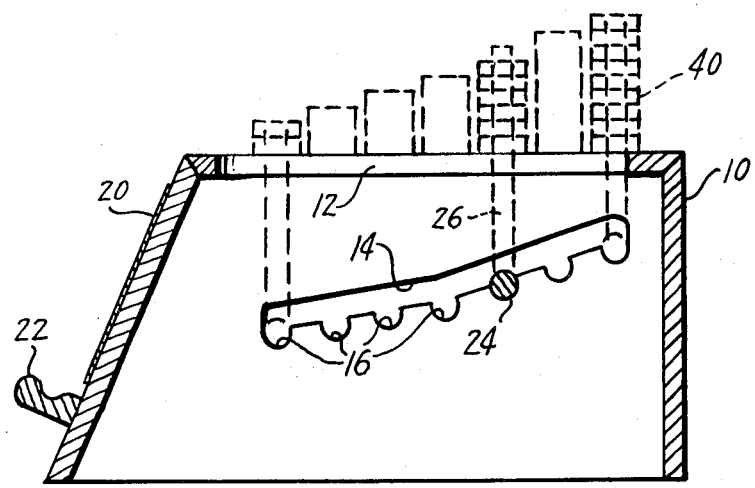
FIG. 3 is a sectional view taken on line 3—3 of FIG. 2.
Figure 5:
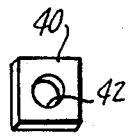
FIG. 5 is a perspective view of the counting ring.
Figure 4:
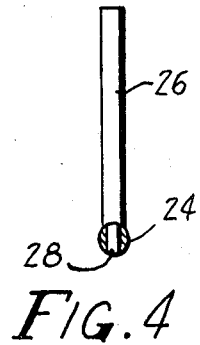
FIG. 4 is a side elevational view of a vertical rod extending form the master control rod.

Referring in detail to the drawing, there is a housing 10 having a series of longitudinal slots 12 parallel to the sides of housing 10, an inclined longitudinal slot 14 in each side of housing 10 sloping upward toward the back thereof, a series of grooves 16 in the lower wall of slot 14 having longitudinal axes transverse with the plane within which the side of housing 10 lies, and an inclined front wall 18 sloping upward and backward toward the rear of housing 10 and having thereon a chalk board 20 with a chalk holder 22. A horizontal master control rod 24 having a length greater than that of housing 10 is inserted through each inclined slot 14 and is positioned within a groove 16 as desired, each groove 16 on one side of housing 10 corresponding with a groove 16 on the other side of housing 10. A series of vertical pegs 26 are spaced along rod 24 in such a manner that each peg 26 protrudes from a corresponding slot 12. Each peg 26 has a reduced bottom portion 28 which is inserted into a bore in rod 24 for vertically securing the peg.

A plurality of rings 40 having a hole 42 in the middle thereof slightly larger than the diameter of pegs 26 are adapted to be placed over pegs 26 during the place-value arithmetic learning process. The height of pegs 26 above the top of housing 10 and the number of rings 40 that can be placed over each peg 26 is adjusted by positioning rod 24 along inclined slot 14. The numerical indicia below each inclined slot 14 indicates the base of the place-value system in use. The system indicated then limits the number of rings 40 which can be placed on pegs 26. Thus, in FIG. 1, a total of seven rings 40 could be placed on each peg 26 since the indicia "8" indicates base eight. The device is a working game for other place-value system bases. For example, when rod 24 is in groove 16 over "10" the length or base of the first peg 26 above the top of housing 10 will only allow nine rings to fit over the peg to indicate one "ten." Thus, when the device is adjusted to the numeral base 10, the child learns that ten is 10, which is one on the tens peg and zero on the ones peg since the top surface of the ninth ring 40 on the ones peg will be flush with the top end of the peg.

While the preferred embodiment of this invention has been illustrated and described, it will be understood by those skilled in the art that various modifications and changes may be restored to without departing from the spirit and scope of the invention.

I claim:

1. An arithmetic teaching device, comprising a housing having an inclined longitudinal slot in each sidewall thereof, a series of grooves in the lower wall of each said inclined slot, the longitudinal axes of said grooves being transverse with the plane in which the sidewall of said housing lies in, and a series of longitudinal slots in the top wall thereof transverse with the axes of said grooves, first means in alignment with said series of slots acting as a numerical base, and second means inserted through each of said inclined slots and connected to said first means for adjusting said first means in order to perform arithmetic tasks.

2. The device of claim 1, wherein said second means is positioned within each said inclined slot by means of each said series of grooves, said second means enabling the user of a device to change the numeral base of said first means.

3. The device of claim 2, wherein said first means includes a series of vertical pegs protruding through said series of slots, the height of said series of pegs above the top of said housing forming the basis of the numeral base.

4. The device of claim 3, including a plurality of rings having a hole at the center thereof, the diameter of which is slightly greater than the diameter of each of said series of pegs, the number of rings that can be placed over any of said series of pegs being directly related to and corresponding to the groove of said series of grooves within which said second means lies and being one less than the identicated base numeral.

5. The device of claim 4, wherein the maximum height of said series of pegs in the use of base 10 will allow nine of said rings to be placed thereon, this concept applying to all other bases also, thus necessitating a tenth ring to be placed on the next adjacent peg, said series of pegs thereby forming a ones peg, a tens peg, a hundredths peg, and so on corresponding with the digits of the number.

6. The device of claim 5, wherein indicia below each of said series of grooves bears a direct relationship to the maximum number of rings that can be placed on said series of pegs when said second means is positioned therein allowing the place-value base to be used so that a learning experience can be completed for any base system.

* * * * *